Sept. 25, 1945.　　　　R. G. PIETY　　　　2,385,378
WELL SURVEYING
Filed June 11, 1942　　　2 Sheets-Sheet 1

INVENTOR
R. G. PIETY
BY
ATTORNEYS

Sept. 25, 1945.　　　　　R. G. PIETY　　　　　2,385,378
WELL SURVEYING
Filed June 11, 1942　　　　2 Sheets-Sheet 2

INVENTOR
R. G. PIETY
BY Hudson, Young & Yinger
ATTORNEYS

Patented Sept. 25, 1945

2,385,378

UNITED STATES PATENT OFFICE 2,385,378

WELL SURVEYING

Raymond G. Piety, Bartlesville, Okla., assignor to Phillips Petroleum Company, a corporation of Delaware Application June 11, 1942, Serial No. 446,680

9 Claims. (Cl. 250—83.6)

The present invention relates to a method of surveying of a well bore, particularly with regard to the relative permeability of the formations penetrated by the bore hole.

At the present time the permeability of the formations penetrated by a well bore can be determined only by examination of cores cut from the formations. The cutting or taking of the core is usually done during the drilling operation. The regular drilling is interrupted for a period of time sufficient to cut and recover a cylindrical core from the formation. The coring procedure is time consuming and therefore costly. An alternative coring procedure is to take the cores from the side wall of the hole after the passage of the drill. The cores obtained must be tested with precise equipment usually kept in a laboratory. Therefore, the cores obtained must be carefully marked as to origin or depth from which they are obtained along the well bore for identification when tested. The cores taken from the side walls are small and while useful for identification of the stratum, are frequently of little value for permeability tests.

The present invention provides a method of determining relative permeabilities of the formations in place along the well bore and eliminates the necessity of coring the formations. The relative permeability to either oil, water or gas may be measured so that differentiation between oil and water sands may be made.

An object of this invention is to provide a method of observing relative actual permeabilities of earth formations in situ and including any mud coating thereof penetrated by a bore hole.

Another object is to provide a method of measuring the thickness of the mud cake in a well being drilled.

Other objects and advantages of the present invention will be apparent from the following detailed description taken together with the accompanying drawings.

Figure 1:
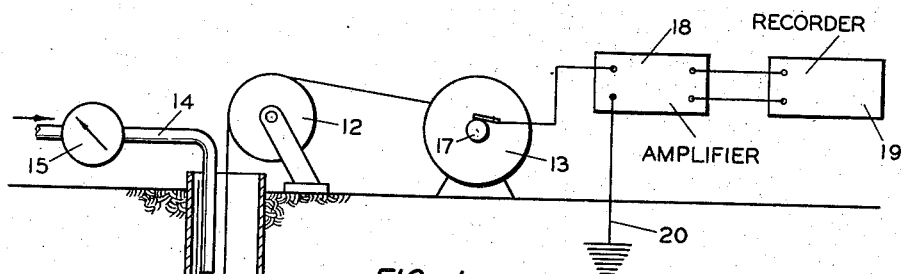
Fig. 1 is a diagrammatic sectional view through a section of earth at a bore hole, showing the apparatus in use.

It is customary to measure the permeability of a core in the laboratory with the original oil and water removed. In this case the term applies to a property of the core itself. M. Muscat in his book "Flow of Homogeneous Fluids," pages 55–119, derives the relation for the permeability $k$, $$K = \frac{uQL}{A(P_1 - P_2)}$$

where A is the uniform cross section of the core, L is the length, $P_1-P_2$ is the pressure difference across the ends of the incompressible fluid of viscosity $u$. In the further discussion here it is assumed that for any section of the well under consideration the quantity $uL/A$ $(P_1-P_2)$ can theoretically be replaced by another constant which takes into account the change in method of measurement and the particular depth and diameter of that section of the well. When this is true then the permeability $k$ will be proportional to Q the quantity of fluid per unit time. This relative permeability will not be independent of the fluid used because in general the rock will contain oil, water and gas. However, this broader sense will be used here for the term permeability. This sense is in many cases a sense in which the term describes an important property of a well since it is a measure of the relative quantity of fluid which will flow into the formation at any point under the conditions existing at the time of measurement. In the following discussion the term permeability will be used in the sense just described.

Permeability as used herein thus refers to the actual permeability of the natural formation in situ along with any mud cake it may have on its surface to the specific fluid in the well, which permeability may or may not be corrected mathematically for pressure differences due to hydrostatic head and/or area differences caused by changes in diameter of the well bore. The specific permeability of a cleaned cubic unit of the material under laboratory conditions is not referred to, although the specific permeability may be more or less proportional to the actual permeability as defined.

With reference to the drawings the numeral 6 designates the well bore, partly cased with a metallic casing 7 and having an uncased portion 8. The essential elements of the apparatus for investigating the bore hole for actual permeability are a radioactivity detector 9 and a sample ejector 10 attached to the cable 11. The cable 11 preferably contains at least one electrical conductor electrically insulated from fluid in the well bore.

Figure 3:
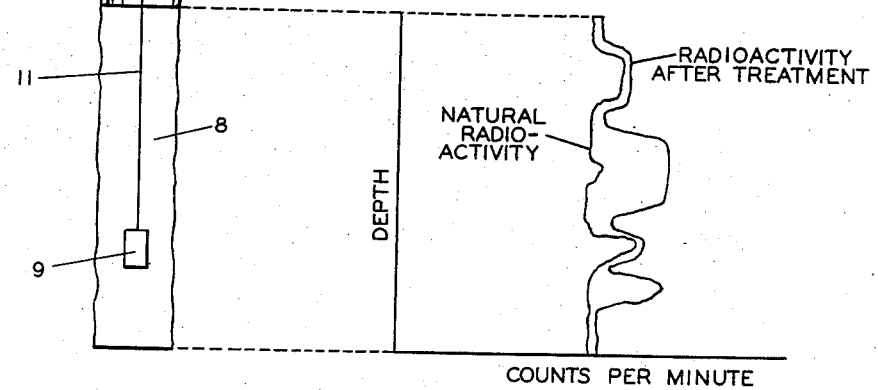
Fig. 3 is an illustrative log of the uncased portion of the well bore of Fig. 1.

The cable 11 passes over a sheave 12 at the surface of the earth to a cable reel 13 by means of which the cable in the well bore may be extended or retracted. Fluid, either liquid or gas, may be supplied to the well bore through the pipe 14 for the purpose hereinafter disclosed. The quantity of fluid so supplied to the well bore is measured by a suitable meter 15. Electrical contact between the electrical conductor of the cable and electrical apparatus at the surface of the earth is made through the slip ring and brush connection 17 on the cable reel. The surface equipment preferably comprises an amplifier 18 and a recorder 19. The surface apparatus is grounded at the point 20 on the surface of the earth to complete the electrical circuit. Although it is preferable to place the amplifier 18 and recorder 19 at the surface of the earth, it is within the scope of this invention to include one or both of these elements in the radioactivity detector 9 within the bore hole. Radioactivity detectors are well known. The most popular detectors at the present time are the ionization chamber and the Geiger-Muller counter. Both have been successfully used in making radioactivity surveys of well bores. These detectors are responsive to radioactive radiations from the earth formations surrounding the well bore in which they are placed. Electrical signals are produced which may be recorded to form a well log of the well bore. Such a log is illustrated in Fig. 3, the left hand trace representing the variations in the natural radioactivity of the earth surrounding the open or uncased portion 8 of the well bore of Fig. 1.

Briefly, the procedure for surveying the uncased portion of the bore hole in accordance with this invention is as follows. The bore hole is first logged for natural radioactivity by use of the detector 9 in known manner. This first log serves as a means of subtracting the natural radioactivity from the radioactivity added later, but in many instances this first log can be omitted as the natural radioactivity is low compared to what can be added and rough results may be sufficient. The amount necessary to add in order to omit the first log varies with the formations expected and the accuracy desired. Fluid from pipe 14 is introduced into the well bore until the pressure head built up in the well bore exceeds the formation pressure. The fluid added to the well bore penetrates one or more of the permeable strata along the uncased section at a rate controlled by the rate of addition of fluid through pipe 14. This rate may be determined by the meter 15 or by measuring the time required for the sample from the ejector to reach the detector. A radioactive substance capable of mixing with the fluid introduced into the bore hole is injected into the fluid by the sample ejector 10. The radioactive substance mixes by the turbulence of the injection with a layer of the fluid, and as the fluid moves down the well out into the formation radioactive substance from this downwardly moving layer is distributed among the various formations as the layer passes them in quantities substantially directly proportional to the time the layer is opposite each formation and the rate of flow of fluid into each formation.

As the layer is made thinner by loss to each permeable formation, the rate of travel of the fluid past each succeeding formation is also lowered by loss to the upper formations, so that the time that the radioactive layer is opposite each formation is exactly the same. For example if there were four well areas of equal length each taking one unit of water per second and a layer of radioactive fluid 16 units long the velocity of the layer at the first area would be 4 units per second and 4 units of the layer would enter the formation. At the second area the velocity of the layer would be only 3 units per second but the layer would only be 12 units long and 4 units of the layer would enter the second formation. At the third area the velocity of the layer would be reduced to 2 units per second and with its length of 8 units, 4 units would enter the third formation leaving 4 units to enter the fourth formation. This provides that the quantity of radioactive substance left at each formation is substantially directly proportional to the actual permeability of that formation.

The time of arrival of the radioactive substance at various points at known distances from the ejector may be taken (1) by following the radioactive substance down by lowering the detector so that it always reads a relatively high value, or (2) by the preferred method of lowering the detector equally spaced distances and waiting until a certain relatively high value of radioactivity is noted which denotes the substantial arrival of the radioactive substance, noting the time of substantial arrival and lowering the detector to the next point, repeating the procedure with the detector always ahead of the layer or adjacent the lower side thereof until the detector rests on the bottom of the hole. Both methods (1) and (2) avoid undue disturbance of the layer by sudden movements of the detector therethrough. Much can also be learned by successive runs with the detector at different selected fixed points in the hole.

From the time of arrival of the radioactive substances at various points at known distances from the ejector the flow rates and relative actual permeabilities of the various formations may be determined. Corrections need not be applied for the usual variations from the drilled size of the well, hydrostatic head, and other factors if the results sought need not be of extreme accuracy. The reading upon arrival of the radioactive substance is obviously high so that the natural radioactivity of the formation is not important in calculations of arrival.

Such corrections may be applied, as obvious to those skilled in the art. However, the only information generally of interest to geologists and well production men is the presence or absence of relatively great changes in permeability. Small changes in actual permeability are of no significance. The methods discussed are therefore all fully operative for all practical purposes.

A second log of the radioactivity of the uncased portion of the well bore is made showing the increase in radioactivity due to the presence of the radioactive substance as deposited in and along the several formations. This second log is obviously preferably made in the same direction and at the same point to point velocity as the point to point travel of the radioactive layer so that the time of leaching will be the same from point to point. However, the second log may be run at random in the opposite direction with comparable and still useful results. By comparison of the log of natural radioactivity with the log made after introduction of the radioactive substance, the permeable strata are indicated, both as to extent and as to relative permeability.

As an illustrative example of the mechanics of the present invention, consider that water is added to the well bore of Fig. 1 so that it enters the uncased portion 8 at a constant known rate. Any given section of the water along the well bore will, with mild turbulence and diffusion, be divided along the uncased formation exposed to the input water in substantially the same proportions as will the long time distribution of the total input water. If this section of the water is identified by giving it a special property which may be used as an indicator of the quantities which enter the various strata along this portion of the well bore, and this special property will linger near the surface so that it may be detected a measure of the permeability of the section is afforded by this indicator. The water may be suitably identified by injecting into the water a sample of radioactive material. A suspension of finely divided activated charcoal made in the usual and old way of making suspensions of solids with wetting or dispersion agents which suspension contains adsorbed radon gas has been found suitable as the radioactive material. In such a suspension the particles are held apart by the dispersion properties of like electrical charges on the particles and possibly Brownwinian movement due to molecular collisions. The fact remains, regardless of cause, that such suspensions of charcoal are old and do stay homogeneous and the added radon gas in small quantities absorbed in the charcoal and the slow diffusion of fluids in the bore hole do not effect any change in the suspension. The charcoal is deposited and held up on the surface of the hole by the filtering action of the porous rock. The amount of charcoal adhering to the wall by diffusion is negligible. The concentration of the radon on the surface of the bore hole at any point is a measure of the relative quantity of water entering the formation at that point.

The radioactive material used in carrying out the method of the present invention may be either naturally or artificially radioactive. Radium, radon, and thorium, are among the materials which may be successfully employed. Radon is preferred as it is probably the most easily obtained and the cheapest. Radon is highly radioactive. Its disintegration products send out penetrating gamma rays which can be easily detected with a Geiger counter. The amount of radon distributed among the various formations can be measured by lowering a suitably enclosed counter into the well bore and recording the number of responses per unit time induced in the counter. The quantity of radon required is very small, of the order of a few thousandths of a millicurie per foot of uncased bore hole to be surveyed. The radon may be injected into the fluid in the gaseous form or may be preferably first dissolved in water, or other suitable vehicle. The measurements should be made before the vehicle has been carried deep into the porous strata. In practice, a large percentage of the radon is adsorbed from the vehicle by the formation. As an alternative the radon may be adsorbed on a suitable medium, for example on carbon black, an insoluble soap, or an oil emulsion containing a dispersion agent. It is to be understood that the medium chosen depends to some extent upon the fluid introduced into the well bore, which may be water, oil or gas, dependent in turn upon the type well being tested. In most testing work, water is preferred as the fluid added to the well. The same measurements may be made, however, using oil or gas as the fluid to be forced into the formation. If oil is used, the adsorbent for the radioactive material is dispersed in oil in preparation of the radioactive sample. Oil is preferred for injection in those oil producing wells in which the intrusion of water into the productive formation results in difficulties in reestablishing the flow of oil after the survey. In using gas as the injected fluid, the radioactive material is preferably in gaseous or finely divided powdered form.

In the event that it is desired to differentiate between the portions of the formation producing gas, oil and water in a productive well, three different measurements may be made in which gas, oil and water, respectively, are used to carry the radioactive material to the formation. By using the different fluids it is possible to take advantage of the fact that the permeability of a formation containing fluid is much different for a foreign invading fluid than for the same invading fluid. The measurements may be made quite independently if made a month or so apart, since the natural decay in activity of radon will greatly reduce the radioactivity over that observed in the previous measurement.

This method of measurement must be modified when it is necessary to evaluate the effect of cracks such as may occur in limestone formations. The presence of a crack would be suspected when the total quantity of radon as measured by the counter does not add up to the quantity placed in the well when allowance is made for leaching by the flowing water and natural decay. In this case additional information can be obtained by injecting the radon above the counter and measuring the time required for the radon to flow past the counter the counter being lowered equal distances and the time of arrival noted as discussed above. The velocity is inversely proportional to the area of the hole and directly proportional to the quantity of fluid taken by the formation below the point under consideration. By making a series of velocity measurements the positions where the downward velocity of flow falls off sharply will locate the probable position of a crack.

In order to carry out the above outlined procedure, certain special instruments, forming a part of the present invention, have been designed. To minimize the effect of the leaching action of the well fluid upon the radioactive material, and to reduce the time required for a given sample to reach the portion of the well bore to be surveyed, it is desirable to inject the sample into the fluid at a point near that section. Usually, all of the uncased portion of the well bore is surveyed. Under these conditions, the sample is preferably injected into the fluid at some point immediately above the casing seat as illustrated in Fig. 1 by the position of the ejector 10. The detector 9 is placed below the ejector 10. This enables the operator to determine the rate of flow by the time of the arrival of the radioactive substance at the detector 9 a given distance below the point of injection. The injected fluid is, of course, carried downward by fluid entering the formations from the well bore. It is important in this measurement of rate of flow that the detector be placed at a point below the ejector prior to injection of the fluid into the well fluid to prevent unnatural mixing and disturbance of the sample which would otherwise occur when the detector is lowered through the radioactive material. This arrangement of the apparatus is illustrated in Fig. 1 of the drawings. It is understood by those skilled in the art that the detector responds to radioactive radiations and produces electrical signals which vary in direct proportion to the number of radioactive radiations striking the detector during a given interval of time. The electrical signals produced by the detector are transmitted to the surface of the earth by means of the electrical conductor incorporated in cable 11. At the surface of the earth, the signals are amplified in the amplifier 18 and recorded by the recorder 19. The record is known as the log of the well and as such is well known to the oil industry.

Figure 2:
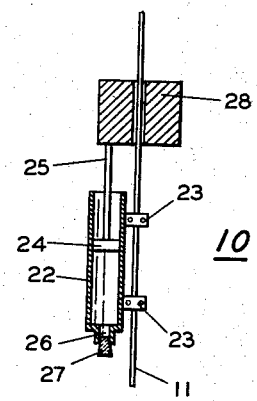
Fig. 2 is a cross sectional view showing details of one modification of the sample ejector.

Figure 2 shows the details of the sample ejector 10. The sample of radioactive substance, dissolved or dispersed in a suitable medium, is contained in the cylinder 22 clamped to the cable 11 by the clamps 23. The cylinder is provided with a piston 24 having an extended piston rod 25. The outlet 26 of the cylinder is closed by a plug 27. A go-devil 28, comprising a weight adapted to slide along the cable 11 is employed to operate the ejector.

In operation the ejector containing the radioactive sample is lowered to the desired position within the well bore. The go-devil 28 is then released from the surface of the earth. Upon reaching the position of the ejector, the go-devil 28 strikes the piston rod 25 forcing it downward. The hydraulic pressure within the cylinder 22 unseats the plug 27 which allows the radioactive sample to escape through the outlet 26.

The time of ejection of the sample is noted by the operator. The radioactive material is carried downward by the well fluid to the detector 9 a known distance below the ejector. The operator notes the time of arrival of the radioactive sample or a portion thereof at the detector. The rate of flow can then be computed since the size of the well bore is known to the operator or can be determined. The permeability of the formations is determined by measuring the rate of flow at a series of points along the uncased portion of the well bore. This is accomplished by following the radioactive sample as it is carried along the well bore by the well fluid entering the formations, or by determining the arrival time of the sample at the various points along the formation as described above. The rate of flow diminishes from point to point along the uncased portion due to the entrance of part of the fluid into the porous formations above.

Fig. 3 illustrates comparatively, two radioactivity logs of the same section of well bore, the uncased portion of the well bore of Fig. 1. The left hand trace of Fig. 3 is the log of the natural radioactivity of the bore hole prior to treatment with radioactive substances. Such well logs are now well known to the petroleum industry. The right hand trace represents the radioactivity of the same section of the well bore after being treated with radioactive material and surveyed in accordance with the present invention. A comparison of the two traces reveals that the treatment resulted in only a small increase in radioactivity in some sections and in rather large increases in other sections along the uncased portion of the well bore. The sections showing large increases in radioactivity are permeable sections penetrated by the fluid from the well bore and by the radioactive material contained in the fluid. The relative actual permeability in situ of different sections is indicated by comparison of radioactivity increases at the different sections.

Figure 4:
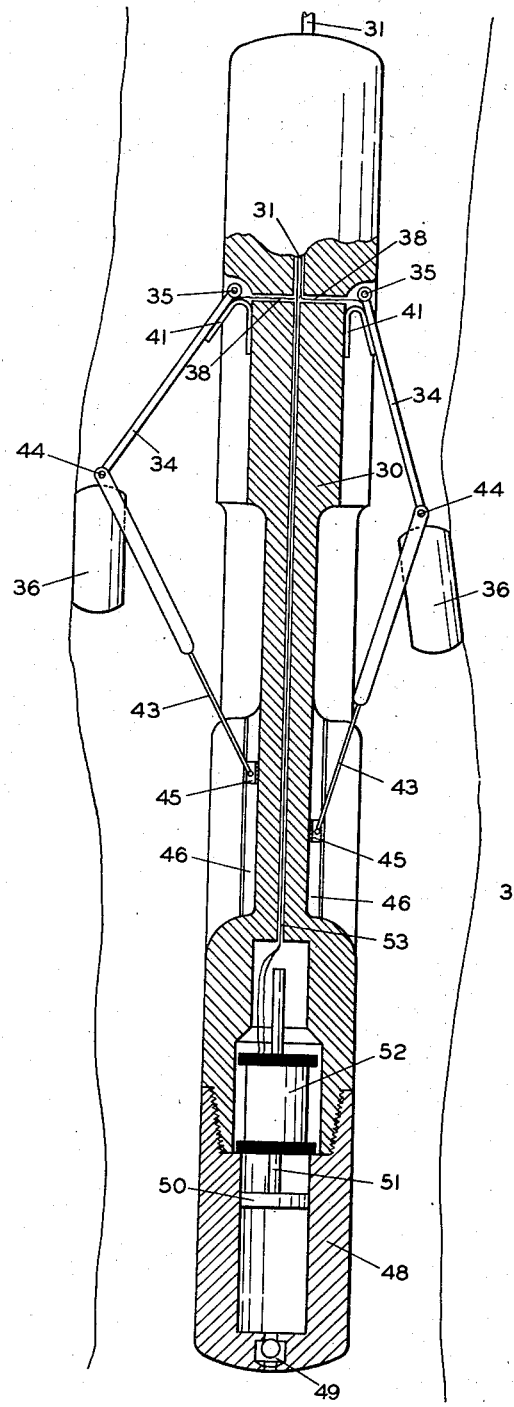
Fig. 4 is a cross section of the surveying instrument embodying another modification of the sample ejector.
Figure 5:
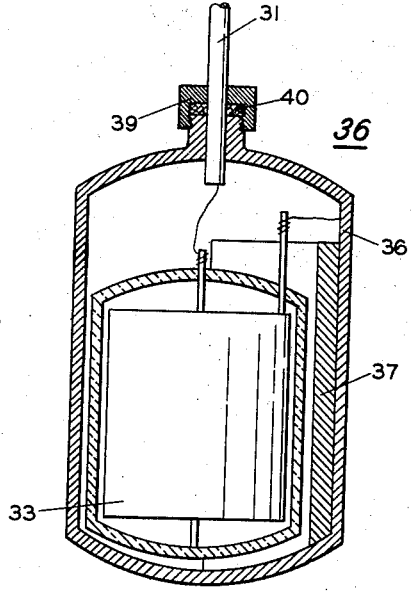
Fig. 5 is a cross section of a portion of the surveying instrument of Fig. 4.

Figures 4 and 5 show details of an improved detector forming a part of the present invention. The detector comprises an elongated body member 30 connected ato the cable 31 and adapted to pass along the well bore 32. A plurality of Geiger-Muller counters, 33 in Fig. 5, are supported by the body member and attached to arms 34, which hingedly attach to the body member at the pins 35. The counters 33 are enclosed in a fluid-tight capsule, preferably of aluminum, which allows free passage of the radioactive radiations to the counter within. The lead shield 37 is arranged to prevent reception of radioactive radiations by the counter from the direction of the body member 30. Insulated electrical conductors 38 connected to the counter 33 pass through the packing gland 39 and packing 40 of each capsule and along each arm 34 to the body member 30 where they join the cable 31. The arms 34 are urged into extended position by springs 41. Auxiliary arms 43 are hingedly attached to the arms 34 at the hinge pin 44, and terminate at the slide blocks 45 in the slots 46 formed within the body member.

A modified form of the sample ejector mechanism is incorporated in the surveying instrument. The cylinder 48 is screw threaded to the body member 30. The valved outlet 49 at the lower end of the cylinder allows egress of the sample while preventing ingress of external well fluid. The piston 50 of the ejector is connected to a piston rod 51 which is actuated by the solenoid 52. The radioactive sample is ejected from the cylinder 48 by energizing the solenoid 52. Electrical conductors 53 joined to the cable 31 supply electrical energy to the solenoid at the will of the operator.

In operation, the apparatus of Fig. 4 is lowered into the bore hole and moved along the portion to be surveyed by means of the cable 31. The springs 41 extend the arms 34 causing the capsules 36 to come into close proximity with the walls of the well bore. The Geiger counters 33 contained in the capsules are excited by radioactive radiations from the radioactive materials in and along the surface of the stratum at the well bore. The lead shields 37 prevent excitation of the counters from radiations from across the bore hole. It is understood by those skilled in the art that well bores are of somewhat variable diameter and that the intensity of radioactive radiations diminishes considerably with distance. The apparatus of the present invention, having flexible arms for supporting the Geiger counters at the surface of the formation, reduces fluctuations or inaccuracies in determining the radioactivity of the formations along the well bore. The Geiger counters are maintained in constant relation to the wall of the well bore at all times thereby eliminating those inaccuracies normally attendant upon such measurements due to the variable diameter of the well bore.

Many advantages of determining the relative permeabilities of the formations in situ will be at once evident to those skilled in the art. As an example, the present method may be used to evaluate the effect of shooting a well by comparing the permeability before and after the shooting. The results of the first measurement may be used as a guide in placing the explosives at the points of low permeability.

Another instance where these measurements are useful is in determining the effect of acidizing a well and determining the points where acid is most needed.

When it is suspected that fluid is entering at the casing seat, the survey for radioactivity would naturally start well above the casing so that leakage back of the casing would be detected. This last test is not, properly speaking, a permeability measurement but an incidental test which can be made.

I claim:

1. The method of surveying a well bore to determine at least one relationship of the relationships of approximate depth, approximate linear extent in depth, and approximate ability to receive additional fluid in situ, of earth formations in the uncased portion of the well, comprising in combination the steps of making a first radioactivity log of the natural radioactivity of the formations in situ in the well, injecting finely divided solid material having radioactivity into a section of the fluid in the well above the portion of the well in which the survey is to be made, forcing the well fluid down and out of the well into such of the earth formations as will receive the well fluid, making a log of the velocity of an interface of said section and the other well fluid, making a second log of the radioactivity of the formations in situ in the well, making at least one later log of the radioactivity to determine leaching and determining from comparison of said logs at least one of said relationships.

2. The method of surveying a well bore to determine at least one relationship of the relationships of approximate depth, approximate linear extent in depth, and approximate ability to receive additional fluid in situ, of earth formations in the uncased portion of the well, comprising in combination the steps of injecting finely divided solid material having radioactivity into a section of the fluid in the well above the portion of the well in which the survey is to be made, forcing the well fluid down and out of the well into such of the earth formations as will receive the well fluid, making a log of the velocity of an interface of said section and the other well fluid, making a log of the radioactivity of the formations in situ in the well, making at least one later log of the radioactivity to determine leaching and determining from comparison of said logs at least one of said relationships.

3. The method of surveying a well bore to determine at least one relationship of the relationships of approximate depth, approximate linear extent in depth, and approximate ability to receive additional fluid in situ, of earth formations in the uncased portion of the well, comprising in combination the steps of making a first radioactivity log of the natural radioactivity of the formations in situ in the well, injecting finely divided solid material having radioactivity into a section of the fluid in the well above the portion of the well in which the survey is to be made, forcing the well fluid down and out of the well into such of the earth formations as will receive the well fluid, making a log of the velocity of an interface of said section and the other well fluid, making a second log of the radioactivity of the formations in situ in the well, and determining from comparison of said logs at least one of said relationships.

4. The method of surveying a well bore to determine at least one relationship of the relationships of approximate depth, approximate linear extent in depth, and approximate ability to receive additional fluid in situ, of earth formations in the uncased portion of the well comprising in combination the steps of injecting finely divided solid material having radioactivity into a section of the fluid in the well above the portion of the well in which the survey is to be made, forcing the well fluid down and out of the well into such of the earth formations as will receive the well fluid, making a log of the velocity of an interface of said section and the other well fluid, making a log of the radioactivity of the formations in situ in the well, and determining from comparison of said logs at least one of said relationships.

5. The method of surveying a well bore to determine at least one relationship of the relationships of approximate depth, approximate linear extent in depth, and approximate ability to receive additional fluid in situ, of earth formations in the uncased portion of the well, comprising in combination the steps of injecting material having radioactivity into a section of the fluid in the well above the portion of the well in which the survey is to be made, forcing the well fluid down and out of the well into such of the earth formations as will receive the well fluid, making a log of the velocity of an interface of said section and the other well fluid, making a log of the radioactivity of the formations in situ in the well, making at least one later log of the radioactivity to determine leaching and determining from comparison of said logs at least one of said relationships.

6. The method of surveying a well bore to determine at least one relationship of the relationships of approximate depth, approximate linear extent in depth, and approximate ability to receive additional fluid in situ, of earth formations in the uncased portion of the well, comprising in combination the steps of making a first radioactivity log of the natural radioactivity of the formations in situ in the well, injecting material having radioactivity into a section of the fluid in the well above the portion of the well in which the survey is to be made, forcing the well fluid down and out of the well into such of the earth formations as will receive the well fluid, making a log of the velocity of an interface of said section and the other well fluid, making a second log of the radioactivity of the formations in situ in the well, and determining from comparison of said logs at least one of said relationships.

7. The method of surveying a well bore to determine at least one relationship of the relationships of approximate depth, approximate linear extent in depth, and approximate ability to receive additional fluid in situ, of earth formations in the uncased portion of the well, comprising in combination the steps of injecting material having radioactivity into a section of the fluid in the well above the portion of the well in which the survey is to be made, forcing the well fluid down and out of the well into such of the earth formations as will receive the well fluid, making a log of the velocity of an interface of said section and the other well fluid, making a log of the radioactivity of the formations in situ in the well, and determining from comparison of said logs at least one of said relationships.

8. The method of surveying a well bore to determine at least one relationship of the relationships of approximate depth, approximate linear extent in depth, and approximate ability to receive additional fluid in situ, of earth formations in the uncased portion of the well, comprising in combination the steps of providing at least a section of the fluid in the well above the portion of the well in which the survey is to be made with a detectable difference in physical characteristics, forcing the well fluid down and out of the well into such of the earth formations as will receive it, making a log of the approximate velocity of the interface between said section and the other well fluid by detection of said detectable difference and determining from said log at least one of said relationships.

9. The method of surveying a well bore to determine at least one relationship of the relationships of approximate depth, approximate linear extent in depth, and approximate ability to receive additional fluid in situ, of earth formations in the uncased portion of the well, comprising in combination the steps of making at least a section of the fluid in the well above the portion of the well in which the survey is to be made strongly radioactive compared to the other fluid in the well, forcing the fluid in the well down and out into such of the earth formations as will receive it, logging the position of the interface between said section and the other well fluid at least at three positions and determining from the time depth log of the interface at least one of said relationships.

RAYMOND G. PIETY.